(No Model.)   2 Sheets—Sheet 1.
C. A. PARSONS.
STEAM TURBINE.
No. 553,932.   Patented Feb. 4, 1896.
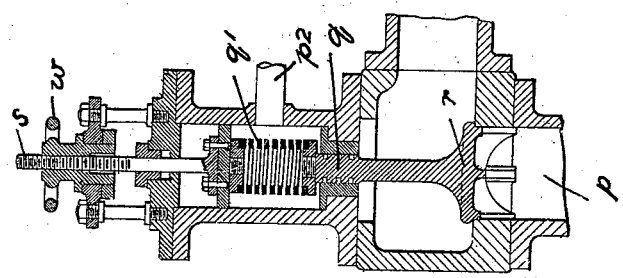
Fig. 2.
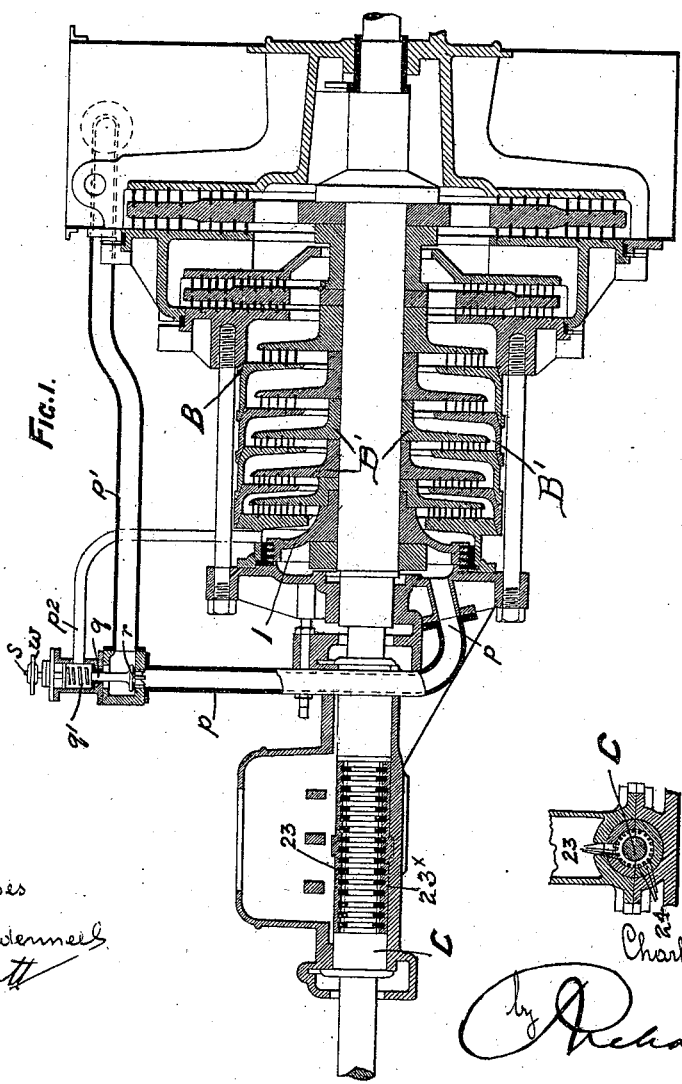
Fig. 1.
Fig. 5.
Witnesses
H. van Oldenneel
E. A. Scott
Inventor
Charles Algernon Parsons
By Richardson
Attorneys

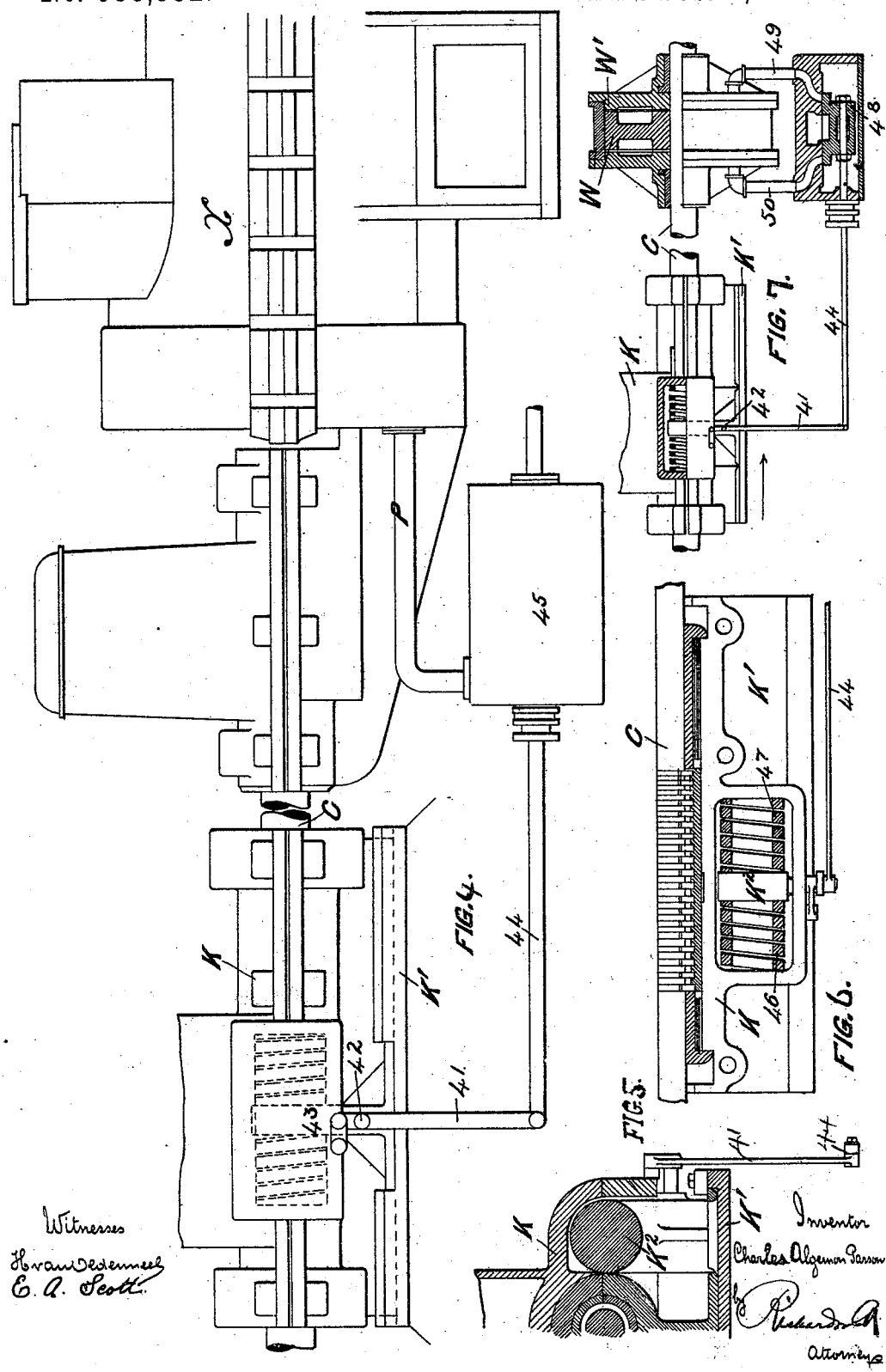

UNITED STATES PATENT OFFICE.

CHARLES ALGERNON PARSONS, OF NEWCASTLE-UPON-TYNE, ENGLAND.

STEAM-TURBINE.

SPECIFICATION forming part of Letters Patent No. 553,932, dated February 4, 1896.

Application filed February 21, 1895. Serial No. 539,198. (No model.)

*To all whom it may concern:*

Be it known that I, CHARLES ALGERNON PARSONS, a subject of the Queen of Great Britain, and a resident of Newcastle-upon-Tyne, in the county of Northumberland, England, have invented certain new and useful Improvements in Thrust-Bearings, of which the following is a specification.

My invention relates to fluid thrust-bearings for propeller and turbine shafting of turbine-propelled vessels, and it includes a thrust or dummy piston combined with the turbine or the propeller shaft with a valve for controlling steam-pressure either to the turbine or to the dummy piston on the propeller-shaft.

My invention includes special features and arrangements of parts hereinafter described.

In the drawings, Figure 1 is a central longitudinal section through any form of my invention, showing a proportional valve. Fig. 2 is a detail view of the valve in section. Fig. 3 is a detail view of a special bearing for the shaft. Fig. 4 is a side view of a modified form of valve mechanism with means for controlling the same. Fig. 5 is a sectional detail view of the same. Fig. 6 is a further detail view thereof, and Fig. 7 is a part side and part sectional view of another modification.

The propeller-shaft C, Fig. 1, has grooves in which spring-plates 23 are fitted, these being in sections. (See Fig. 3.) The outer edges of the plates are fitted in the casing 23×. The spring-plates are notched at 24 to give them greater elasticity, so that when the shaft C is moved lengthwise slightly by the back-thrust from the propeller all the surfaces of the spring-plates are brought to bear on the surfaces of the grooves in order to distribute the thrust of the propeller.

The turbine B of Fig. 1 has a dummy piston 1 combined therewith intended to take up the end-thrust and to reduce the pressure to be taken up by the thrust-block. In this figure a valve is shown adapted to apply a varying steam-pressure behind the dummy piston 1 to meet the varying thrust. When the valve is placed as in Fig. 1 and the thrust of the screw-propeller is balanced by the difference in steam-pressure on the dummy piston 1 and the turbine disks B', then I arrange the area of the dummy piston 1 to be sufficiently large to give a resultant steam-thrust backward greater than that of the propeller and I arrange the valve, Fig. 1, to maintain a pressure in the passage $p$, such as to equilibrate the whole.

I find that the twist exerted by the turbine is nearly proportional to the steam-pressure at the main steam-inlet minus a small fixed quantity, and I also find that the thrust of the propeller is nearly proportional to the twist exerted by the screw-shaft. This being so I arrange the valve, Fig. 1, to maintain a pressure at $p$ which shall be proportional to the steam-pressure at the inlet to the turbine minus a small constant quantity. If the turbine is so placed that the low-pressure end is nearest to the screw-propeller, I arrange the dummy piston to be too small to balance the turbine disks and the thrust of the propeller, and I arrange, as before, the valve, Fig. 1, to maintain a pressure at the back of the dummy piston 1 proportional to the steam-pressure at the main inlet minus a small quantity.

Fig. 1 shows the valve $r$ used for this purpose. $p$ is the pipe connected to the dummy piston. $p'$ connects to the exhaust or condenser. $p^2$ connects to the main-inlet steam-passage to the turbine. $q'$ is a spiral spring which is adjustable by the screw $s$ and hand-wheel $u'$. The ratio of the areas of the valve $r$ to the piston $q$ fixes the ratio of the steam-pressure at the back of the dummy piston to the inlet steam-pressure. The spring $q'$ subtracts or adds the desired small quantity. Pistons $q$ of different sizes fitting in corresponding liners may be substituted until the necessary ratio of pressure is obtained.

The operation briefly stated is that the valve $r$ when open admits steam-pressure from the pipe $p'$, connected with the exhaust to the pipe $p$, and thus to the rear of the dummy piston, and the amount of opening of the valve $r$ will be controlled by the pressure of the steam entering the valve-case above the piston $q$ through the pipe $p^2$, leading from the inlet end of the turbine to the valve-case, so that the pressure of steam in pipe $p$ will be proportional to the inlet steam-pressure. These balanced-valve arrangements are equally adapted to the parallel-flow type of steam-turbine.

I sometimes prefer to arrange the areas of the piston in the turbine so that the steam-thrust shall at the normal power exactly balance the propeller-thrust, or I may arrange the balance to be exact at some predetermined power and use a simple locked valve which is preferably adjustable to make up the small fixed quantity above referred to. This loaded valve may be an ordinary relief-valve, the construction of which is well known.

In Figs. 4, 5, and 6, respectively side elevation, half-transverse section, and half-sectional plan, there is shown a mode of arranging a sliding thrust-block, controlled by springs in such manner as to increase or diminish the effective steam-thrust on the dummy piston within the turbine to resist the thrust of the screw-propeller.

The thrust-block K slides upon the bed K', which bed is attached to the hull of the vessel, and which is held in a central position while at rest by the strong spiral springs 46 and 47 pressing against the bracket-piece K². This bracket-piece is fixed to the bed K'. When the thrust of the propeller forces the block K forward against the action of the springs 46, a lever 41 is instantly operated. The lever 41 pivots at the point 42, and its short end is operated by the sliding thrust-block, so that a very small movement of the said block causes a considerable movement of the link 44, attached to the long end of the lever. The link 44 operates a balanced steam-valve within the casing 45, and this valve allows steam to flow from the side of the turbine dummy piston nearest to the propeller side of the atmosphere or to accumulate so that the steam-thrust opposing the propeller-thrust is automatically increased or diminished and so the full thrust of the propeller is prevented from coming upon the thrust-collar surfaces.

A reduction of the propeller-thrust causes the thrust-block K to be moved by the springs 46 in the opposite direction. If the rotation of the propeller be reversed, then the springs 47 are compressed and the steam-valve within the casing 45 operates to increase steam-pressure on the side of the dummy piston which is nearest to the propeller.

It will be understood that the turbine in Fig. 4, the outside of whose casing is shown at X, is of the same construction as that shown in Fig. 1 and has a dummy piston like that described. The parts, being shown in Fig. 1, are not illustrated herein, nor has the valve been shown in detail, its casing being shown at 45, said valve being of any desired construction and adapted to control the steam-pressure at the back of the dummy piston, while it is in turn controlled by the mechanical connection to thrust-block K. The difference between this form and that before described is that the valve is controlled in this through mechanical connections to the propeller-shaft, whereas in the former case the valve is controlled by the steam-pressure thereon in proportion to the steam-pressure in the turbine.

In Fig. 7, which is a longitudinal elevation, partly in section, the balancing or dummy piston is placed on the propeller-shaft instead of on the turbine spindle. The balancing or dummy piston is shown at W as keyed to the propeller-shaft C rotating within a cylinder W', which cylinder is fixed to the hull of the vessel. The thrust-block K slides on the bed K' and is resisted by springs, as in Figs. 4, 5, and 6, and similarly it operates a lever 41 pivoted at 42 and a link 44 attached to a slide-valve 48. When the forward propeller-thrust increases to a sufficient extent to overcome the thrust-block springs, the block K moves in the direction of the arrow and the valve 48 is so moved as to admit steam-pressure from the valve-chest by way of the pipe 49 to that side of the piston W which is farthest removed from the propeller. Steam-pressure thus applied acts on the piston W to resist the propeller-thrust. The reversal of the turbine or the reduction of the thrust to such an extent as to move the block K in the contrary direction to the arrow causes the valve 48 to so move as to remove or reduce steam-pressure on one side of the piston W and to increase it on the other side by admitting steam by way of the pipe 50. The varying thrust of the propeller is to some extent resisted by steam-pressure applied to the rotating piston W. Here also the pressure on the dummy piston, and hence the resistance to the end-thrust, is controlled through that valve which in turn is controlled through mechanical connections to the propeller-shaft instead of by the steam-pressure in Fig. 1.

Having now particularly described and ascertained the nature of my said invention and in what manner the same is to be performed, I declare that what I claim is—

1. In combination, the propeller-shaft, the dummy piston thereon, the turbine wheels or disks, the steam-supply pipe leading to the dummy piston to resist the end-thrust, and a valve controlling said steam-supply automatically, and means for controlling said valve in proportion to the end-thrust, substantially as described.

2. In combination, the propeller-shaft, a bearing therefor to allow end-thrust of the same, a dummy piston on the shaft, a steam-supply leading to the dummy piston, a valve controlling said supply, and means controlling said valve in proportion to the end-thrust, substantially as described.

3. In combination, the shaft, the turbine thereon having the dummy piston, and the fluid-supply leading thereto, whereby said dummy piston will balance the end-thrust, substantially as described.

4. In combination, the shaft, and turbine thereon arranged to take up the end-thrust, the inlet for the steam to the turbine, a second inlet for the balancing fluid, a valve controlling the said inlet, a piston controlling the operation of the valve, and a connection from the piston-chamber to the first steam-inlet leading to the turbine, whereby the balancing power of the fluid will be proportional to the fluid-pressure from which the rotation is derived.

In witness whereof I have hereunto set my hand in presence of two witnesses.

CHARLES ALGERNON PARSONS.

Witnesses:
FREDERIC SMITH,
JOHN HETHERINGTON.